US012608358B2

(12) United States Patent
Cuomo et al.

(10) Patent No.: US 12,608,358 B2
(45) Date of Patent: Apr. 21, 2026

(54) MERKLE-ENHANCED TRAINING DATA AUDIT PROCESS

(71) Applicant: International Business Machines Corporation, Armonk, NY (US)

(72) Inventors: Gennaro Anthony Cuomo, Raleigh, NC (US); Blaine H. Dolph, Western Springs, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/508,532

(22) Filed: Nov. 14, 2023

(65) Prior Publication Data

US 2025/0156390 A1 May 15, 2025

(51) Int. Cl.
*G06F 16/22* (2019.01)

(52) U.S. Cl.
CPC ................................ *G06F 16/2246* (2019.01)

(58) Field of Classification Search
CPC .................................................. G06F 16/2246
See application file for complete search history.

(56) References Cited

U.S. PATENT DOCUMENTS

| | | | | |
|---|---|---|---|---|
| 9,705,730 B1 * | 7/2017 | Petri | .................... | G06F 11/1453 |
| 11,886,403 B1 * | 1/2024 | Serena | ................ | G06F 16/2365 |
| 2018/0026791 A1 * | 1/2018 | Bohli | .................. | G06F 16/1748 |
| | | | | 713/154 |
| 2019/0253240 A1 * | 8/2019 | Treat | ..................... | H04L 9/3297 |

| | | | | |
|---|---|---|---|---|
| 2021/0209483 A1 * | 7/2021 | Bose | ...................... | G06N 5/025 |
| 2023/0237477 A1 * | 7/2023 | Coughlan | ............ | G06Q 20/401 |
| | | | | 705/39 |
| 2023/0394063 A1 * | 12/2023 | Zhang | ................... | H04L 9/3239 |
| 2024/0185001 A1 * | 6/2024 | Nagaraju | ............. | G06F 40/284 |
| 2025/0028905 A1 * | 1/2025 | Atashbar | .............. | G06F 40/284 |
| 2025/0068859 A1 * | 2/2025 | Kim | ...................... | G06F 40/289 |

FOREIGN PATENT DOCUMENTS

| | | |
|---|---|---|
| CN | 105868369 B | 10/2019 |
| CN | 114297728 A | 4/2022 |
| CN | 116341554 A | 6/2023 |

OTHER PUBLICATIONS

Azaria, et al., "The Internal State of an LLM Knows When its Lying", http://arxiv.org/abs/2304.13734v1 [cs.CL] Apr. 26, 2023, 10 pages.
Bathen et al., "TrustlessNAS: Towards Trustless Network Architecture Search", 2022 IEEE International Conference on Service-Oriented System Engineering (SOSE), Aug. 15-18, 2022, Newark, CA, USA, DOI: 10.1109/SOSE55356.2022.00020, 9 pages.

(Continued)

*Primary Examiner* — Robert W Beausoliel, Jr.
*Assistant Examiner* — Mohammad S Bhuyan
(74) *Attorney, Agent, or Firm* — Gavin Giraud

(57) ABSTRACT

The present inventive concept provides for a method of verifying data using Merkle proof and root. The method includes organizing a dataset into a Merkle tree, the dataset including a plurality of data elements. A Merkle root is generated that represents the dataset organized into the Merkle tree. A generated Merkle proof is provided for a data element of the plurality of data elements, and it is determined whether the data element is included in the dataset using the Merkle root and the Merkle proof.

20 Claims, 3 Drawing Sheets

(56)        References Cited

OTHER PUBLICATIONS

Diwan et al., "Fingerprinting Fine-tuned Language Models in the Wild", arXiv:2106.01703v1 [cs.CL] Jun. 3, 2021, 13 pages.

Kim et al., "On-Device Federated Learning via Blockchain and its Latency Analysis", ResearchGate, Preprint—Aug. 2018, 5 pages.

Kurtulmus et al., Trustless Machine Learning Contracts; Evaluating and Exchanging Machine Learning Models on the Ethereum Blockchain, arXiv:1802.10185v1 [cs.CR] Feb. 27, 2018, 11 pages.

Lightman et al., "Let's Verify Step by Step", arXiv:2305.20050v1 [cs.LG] May 31, 2023, 29 pages.

Rastaghi, Mehdi Akbarian, "Probing the Robustness of Pre-trained Language Models for Structured and Unstructured Entity Matching", A thesis submitted in partial fulfillment of the requirements for the degree of Master of Science, Department of Computing Science, University of Alberta, 2022, 82 pages.

Wang et al., "DecodingTrust: A Comprehensive Assessment of Trustworthiness in GPT Models", arXiv:2306.11698v1 [cs.CL] Jun. 20, 2023, 95 pages.

* cited by examiner

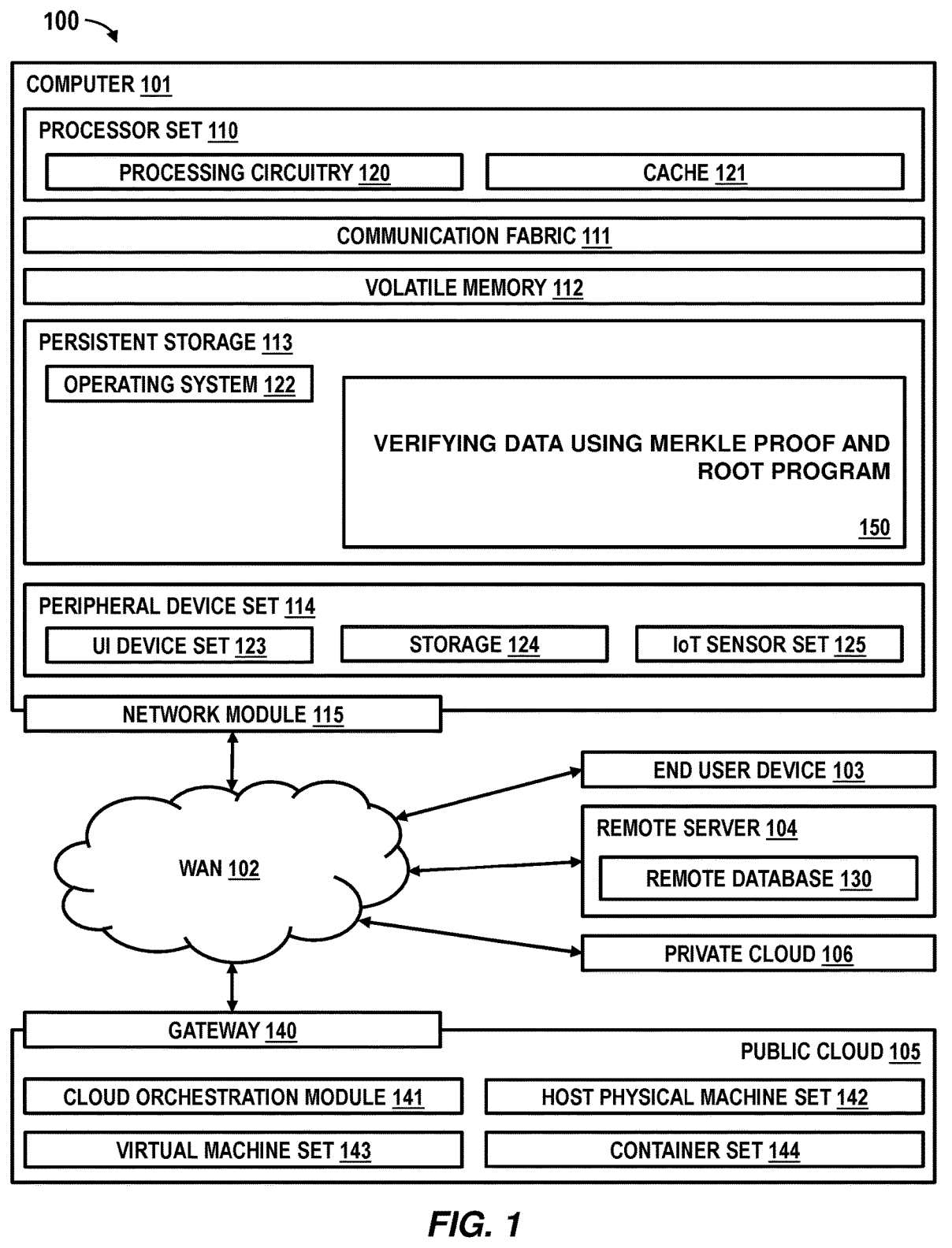

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

VERIFYING DATA USING MERKLE PROOF AND ROOT PROGRAM

150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

*FIG. 1*

DATA PROVIDER
COMPONENT

210

AUDITOR
COMPONENT

220

VERIFYING DATA USING MERKLE PROOF AND ROOT PROGRAM

ORGANIZING A DATASET OF DATA ELEMENTS INTO A MERKLE TREE

302

GENERATING A MERKLE ROOT THAT REPRESENTS THE DATASET ORGANIZED INTO THE MERKLE TREE

304

PROVIDING A GENERATED MERKLE PROOF FOR A DATA ELEMENT OF THE PLURALITY OF DATA ELEMENTS

306

DETERMINING WHETHER THE DATA ELEMENT IS INCLUDED IN THE DATASET USING THE MERKLE ROOT AND THE MERKLE PROOF

308

MERKLE-ENHANCED TRAINING DATA AUDIT PROCESS

BACKGROUND

Exemplary embodiments of the present inventive concept relate to a merkle-enhanced training data audit process.

Various industries are deploying foundation models (e.g., large language models (LLMs)) to perform an array of different tasks (e.g., disease diagnosis, personalized recommendations, content creation, etc.). However, key concerns with the use of LLMs include their lack of transparency and potential trustworthiness with respect to the provenance and integrity of underlying training data, fine-tuning processes, and prompts used to generate specific results. Privacy concerns can also compel restricted disclosure of underlying private and/or proprietary data elements, and thus present difficulties in LLM audits and training data element evaluation. For example, in the healthcare industry, LLMs are used to analyze medical images and provide diagnostic recommendations for patient care. However, the accuracy of these LLMs in providing these diagnostic recommendations is dependent on the quality and diversity of the diagnostic training data elements, such as patient medical records, used to develop them. Additionally, the fine-tuning process used to generate disease diagnoses can be opaque and difficult to reproduce, which can result in patient/provider reliability concerns due to potential inaccuracies and biases in the resulted diagnostic recommendations.

Methodologies used to evaluate data element inclusion/exclusion in the underlying datasets of LLMs include Full Comparison, Checksum, and Blockchain.

Full Comparison involves directly comparing every data element in the dataset, which is simple and does not require additional structures. However, Full Comparison requires comprehensive examination of every data element, which is slow for large datasets.

Checksum involves generating a unique value representing the content of the dataset for quick integrity checks with low storage capacity requirements. However, Checksum cannot check the presence of specific data elements or identify sources of changes to a dataset.

Blockchain involves a chain of blocks in which each block contains a set of immutable data and the hash of the previous block. However, Blockchain requires processing of every block, which is slow for large datasets and requires vast storage capacity.

Existing products and publications related to foundation model data verification also encompass prior work on the utilization of Merkle trees in data integrity verification generally, as well as research on the transparency and explainability of machine learning models. However, none of these prior works have proposed the use of Merkle trees specifically for enhancing the trustworthiness and transparency of LLMs in a highly efficient, logarithmically scalable manner, thereby significantly improving performance and auditability even in the face of extensive data volumes.

SUMMARY

Exemplary embodiments of the present inventive concept relate to a method, a computer program product, and a system for verifying data using Merkle Proof and Root.

According to an exemplary embodiment of the present inventive concept, a method of verifying data using Merkle proof and root is provided. The method includes organizing a dataset into a Merkle tree, the dataset including a plurality of data elements. A Merkle root is generated that represents the dataset organized into the Merkle tree. A generated Merkle proof is provided for a data element of the plurality of data elements, and it is determined whether the data element is included in the dataset using the Merkle root and the Merkle proof.

According to an exemplary embodiment of the present inventive concept, a computer program product (CPP) for verifying data using Merkle proof and root is provided. The CPP includes one or more computer-readable storage media and program instructions stored on the one or more non-transitory computer-readable storage media capable of performing a method. The method includes organizing a dataset into a Merkle tree, the dataset including a plurality of data elements. A Merkle root is generated that represents the dataset organized into the Merkle tree. A generated Merkle proof is provided for a data element of the plurality of data elements, and it is determined whether the data element is included in the dataset using the Merkle root and the Merkle proof.

According to an exemplary embodiment of the present inventive concept, a computer system (CS) for verifying data using Merkle proof and root is provided. The CS includes one or more computer processors, one or more computer-readable storage media, and program instructions stored on the one or more of the computer-readable storage media for execution by at least one of the one or more processors capable of performing a method. The method includes organizing a dataset into a Merkle tree, the dataset including a plurality of data elements. A Merkle root is generated that represents the dataset organized into the Merkle tree. A generated Merkle proof is provided for a data element of the plurality of data elements, and it is determined whether the data element is included in the dataset using the Merkle root and the Merkle proof.

Embodiments of the present invention provide for a method of increasing the transparency, trustworthiness, and verifiability of foundation models, particularly large language models (LLMs), using a cryptographically robust Merkle tree structure to anchor the training data, fine-tuning process, and prompts employed to generate results from the model. The Merkle tree structure is embedded in the model's metadata, allowing an auditor to verify the integrity and provenance of the data and outcomes by computing the Merkle tree for a subset of the training data or prompts and aligning its root hash with the root hash of the model's Merkle tree. An auditor can also be granted access to the original datasets or subsets to verify the training process.

This approach can help address challenges around trust, reproducibility, and scalability in machine learning, and can be applied across an extensive range of industries and use cases, including finance, healthcare, media, and government. By providing a logarithmically efficient, tamper-evident record of the entire training and fine-tuning process, the method can heighten the trust and transparency of LLMs and provide more significant accountability and reliability in decision-making, prediction, and classification tasks. The auditor's access to the original datasets or subsets ensures that the presented data coincides with the original data and that the LLM was trained using the presented data, further optimizing the efficiency and trustworthiness of LLMs.

In an embodiment of the present inventive concept, the dataset is included in a foundation model.

In an embodiment of the present inventive concept, the generated Merkle root and the generated Merkle proof are each a hash.

In an embodiment of the present inventive concept, the generated Merkle root is included in metadata of the dataset.

In an embodiment of the present inventive concept, a generated Merkle proof is requested, and the request of the generated Merkle proof is authorized before the generated Merkle proof is provided for the data element of the plurality of data elements.

In an embodiment of the present inventive concept, the inclusion verification of the data element in the dataset using the Merkle root and the Merkle proof further includes sequentially hashing a data hash of the data element with hashes from the Merkle proof and comparing the sequential hash result and the Merkle root.

In an embodiment of the present inventive concept, if the compared sequential hash result and the Merkle root match, inclusion of the data element in the dataset is verified.

BRIEF DESCRIPTION OF THE DRAWINGS

The following detailed description, given by way of example and not intended to limit the exemplary embodiments solely thereto, will best be appreciated in conjunction with the accompanying drawings, in which:

FIG. 1 illustrates a schematic diagram of computing environment 100 including a verifying data using Merkle proof and root program 150, in accordance with an exemplary embodiment of the present inventive concept.

FIG. 2 illustrates a block diagram of components included in the verifying data using Merkle proof and root program 150, in accordance with an exemplary embodiment of the present inventive concept.

Figure 3:
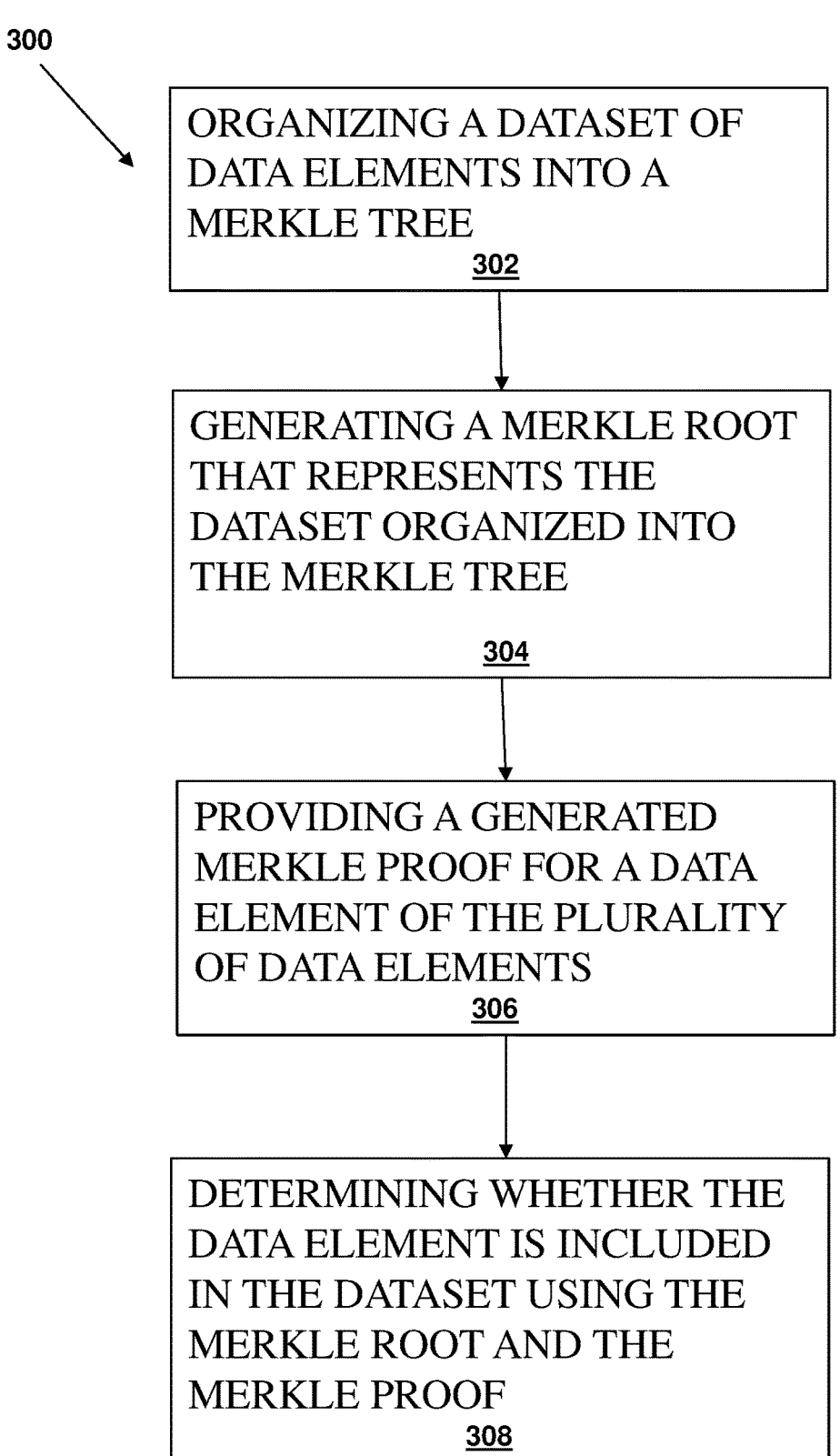
FIG. 3 illustrates a flowchart of a method of verifying data using Merkle proof and root 300, in accordance with an exemplary embodiment of the present inventive concept.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

The present inventive concept addresses the above-mentioned challenges to LLM use by leveraging logarithmically efficient Merkle trees, a cryptographically robust and scalable data structure that enables verification of the integrity and provenance of a dataset by computing the hash of each node corresponding to a data element in a Merkle tree and comparing it to the Merkle root hash. By systematically organizing the training data, fine-tuning process, and prompts into a Merkle tree structure, the entire process of generating results from an LLM becomes not only transparent and auditable, but also optimized for large-scale datasets. This enhances performance and auditability even with substantial increases in dataset volume.

Overall, any industry or use case where LLMs are used for decision-making, prediction, or classification tasks can benefit from increased transparency and trustworthiness using Merkle trees as disclosed herein. The use of Merkle trees to increase the trust and transparency of large language models (LLMs) can be valuable across a wide range of industries and use cases, such as:

Finance: In the financial industry, LLMs are increasingly being used for tasks such as fraud detection, risk management, and trading. The ability to verify the integrity and provenance of the data and results generated by these models can be crucial for maintaining trust and ensuring regulatory compliance.

Healthcare: LLMs are also being used in healthcare for tasks such as medical image analysis, disease diagnosis, and drug discovery. Ensuring the accuracy and trustworthiness of these models is critical for patient safety and maintaining ethical standards.

Media: The use of LLMs in media applications such as natural language processing (NLP), content creation, and content moderation is also growing. Ensuring the trustworthiness and transparency of these models can help to address concerns around bias, privacy, and accountability.

Government: The use of LLMs in government applications such as law enforcement, intelligence, and cybersecurity can have significant implications for privacy, civil liberties, and national security. The ability to audit and verify the data and results generated by these models can help to maintain public trust and accountability.

Relative to existing solutions, the invention delivers several benefits. Firstly, it yields a cryptographically secure, transparent, and auditable record of the whole training and fine-tuning process for AI models, a necessity for regulated industries susceptible to audits on their AI models. Secondly, it facilitates the efficient verification of the integrity and provenance of the training data, fine-tuning process, and prompts used to generate specific results, helping to avert biased and inaccurate outcomes. Thirdly, it imparts a coherent, organized structure for the training data and prompts, which can streamline the prompt engineering process and diminish the likelihood of errors and inconsistencies, all while ensuring logarithmic scale performance even for sizable datasets.

For example, a healthcare provider could use Merkle-linked LLMs to verify the integrity of the training dataset used for a medical image analysis models. By computing the Merkle tree for a subset of data elements in the training dataset that are relevant to the medical image analysis task, the healthcare provider can verify that the underlying dataset was not tampered with and that it was used appropriately to train the LLM while preserving relative anonymity of other data elements. This can provide greater assurance as to the accuracy and reliability of the LLM, which can be crucial, for example, in providing informed decisions in the healthcare industry and ensuring patient confidence/safety. The principal concept of the invention is to leverage Merkle trees to significantly enhance the transparency and trustworthiness of large language models (LLMs). The present inventive concept does so by offering an efficient, secure, and auditable record of the training data, fine-tuning process, and prompts used to generate specific results, providing scalability and verification efficiency that vastly outperforms traditional methods, especially with large datasets.

FIG. 1 illustrates a schematic diagram of computing environment 100 including the verifying data using Merkle proof and root program 150, in accordance with an exemplary embodiment of the present inventive concept.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the verifying data using Merkle proof and root program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
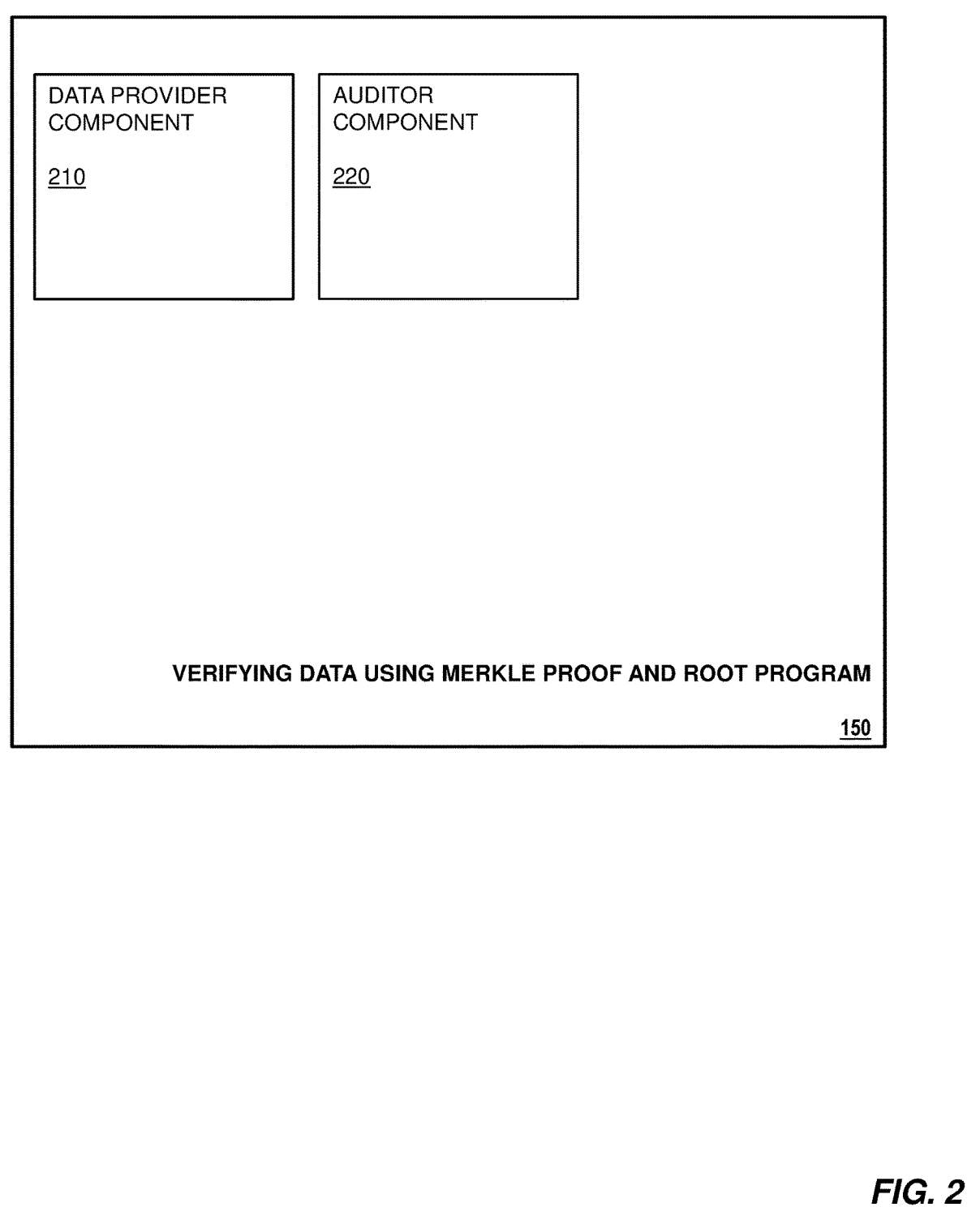

FIG. 2 illustrates a block diagram of components included in the verifying data using Merkle proof and root program 150, in accordance with an exemplary embodiment of the present inventive concept.

The verifying data using Merkle proof and root program 150 can include a data provider component 210. The data provider component 210 can obtain/update a dataset (e.g., training data) that includes a plurality of data elements (e.g., training samples, data entries, prompts, images, videos, text, etc.) for a foundation model (e.g., large language model (LLM)) automatically and/or by user input (e.g., a data provider/prover). The data provider component 210 can organize the data elements into a Merkle tree which includes nodes (e.g., leaf nodes and non-leaf nodes). Each leaf node in the Merkle tree can represent a specific data element and each non-leaf node can represent the hash of its child nodes. A cryptographic hash function (e.g., SHA-256) can generate the hash (e.g., value) for each of the nodes, such as a unique fixed-size string of bytes (e.g., a hexadecimal number). Each hash can correspond to the content of the corresponding data element and/or paired child nodes. The Merkle tree can be organized by taking a list of data elements included in the dataset and hashing them pairwise using the cryptographic hash function to generate a list of hashes. This process can be repeated until a single hash value, known as the root hash (i.e., Merkle root) is generated. The root node (i.e., Merkle root) of the Merkle tree can be a hash of all the data elements included in the Merkle tree. The data provider component 210 can include the Merkle root in metadata of the dataset and/or the foundation model. The Merkle tree can be used to organize the training data, fine-tuning process, and/or prompts in a secure and efficient way. By using a Merkle tree, the integrity and provenance of the dataset (e.g., training data) for an LLM can be ascertained, allowing for transparency and trust in the use of the dataset, which is particularly important when the underlying data elements cannot be openly shared due to privacy and/or security considerations. In an embodiment of the present invention, the data provider component 210 can identify changes in the dataset/root hash for a Merkle tree, corresponding data elements, and/or specific aspects/degrees thereof. Identified changes can be stored in the metadata of the foundation model and/or dataset.

The data provider component 210 can also generate Merkle proofs corresponding to data elements on a preemptive basis and/or based on a triggering condition (e.g., received data element inquiries (e.g., audits)). Data element inquiries can be received from predetermined authorized users (e.g., auditors) to determine the inclusion/exclusion of a data element (such as for verification purposes). The data provider component 210 can subsequently provide an authorized user with a Merkle proof and/or a Merkle root therefor. The Merkle proof can be a subset of the Merkle tree that includes a path from the leaf node (corresponding to the specific data element in question) to the Merkle root node. Generating the Merkle proof can involve selecting the sibling nodes of the hash corresponding to the data element in question and its parent, and repeating this process up the Merkle tree until the Merkle root node is reached. This results in a Merkle proof (e.g., a collection of hashes) that the auditor component 220 (described below) can use to compare to the Merkle root.

For example, the data provider component 210 automatically obtains images of different types of fruit (e.g., apples, bananas, oranges, watermelons, etc.) used to train an image recognition foundation model. The data provider component 210 organizes the images of the fruit into representative leaf nodes and generates a Merkle tree with a representative and unique root hash. The root hash of the various images is stored in the fruit image recognition foundation model metadata. The data provider component 210 generates a Merkle proof for each data element in anticipation of a potential audit.

The verifying data using Merkle proof and root program 150 can include an auditor component 220. The auditor component 220 can be operated by an authorized/verified user and/or computing device. The auditor component 220 can make the data element inquiries to the data provider component 210 automatically and/or upon user (e.g., a data verifier/auditor) input (e.g., data element identity and/or a data element hash). Upon authorization/verification of the user and/or computing device making the data element inquiries, the auditor component 220 can obtain the corresponding Merkle proof and/or Merkle root from the data provider component 210. The auditor component 220 can store the Merkle proof and/or the Merkle root, such as for future data element verification purposes. The auditor component 220 can thus determine whether a specific data element is included in the dataset. The auditor component 220 can hash the specific data element in question and then use the Merkle proof to confirm/deny the inclusion of the data element in question based on whether the data hash and Merkle proof align with the obtained Merkle root. By sequentially hashing the data hash with the hashes from the Merkle proof and determining if the result matches the Merkle root, the auditor component 220 can confirm the inclusion or exclusion of the image in the dataset. If the final hash matches the Merkle root, the data element is verified as tuning processes, which can lead to inaccurate and potential biased results. The proposed invention addresses these drawbacks by providing a transparent and auditable record of the entire training and fine-tuning process for LLMs, which is essential for regulated industries that may be audited on their AI models. The Merkle tree-based approach proposed in this invention provides a higher level of security and verifiability for LLM training data compared to a non-cryptographic approach that simply stores links to the data. While using cryptographic hash functions and the Merkle tree structure adds some computational overhead to the verification process, it's worth it because it provides tamper resistance and auditability. The Merkle tree structure can be optimized for efficient verification, so the overhead is relatively low compared to the overall training process. As the size of the dataset increases, the verification time increases logarithmically (i.e., at a slower rate than the size of the dataset).

As the following comparison table illustrates, Merkle tree-based verification provides superior tamper resistance, auditability, and scalability compared to alternatives like diff comparison. It scales logarithmically, ensuring efficient integrity checks for large datasets, unlike other methods that scale linearly and become inefficient as dataset size increases.

| Method | Description | Pros | Cons |
|---|---|---|---|
| Full Comparison | Directly compare every element in the datasets. | Simple and straightforward. No additional structures required. | Requires going through every element. Slow for large datasets. |
| Checksum | Generate a unique value representing the content of the dataset for quick integrity checks. | Quick validation of dataset integrity. Low storage needs. | Can't check the presence of specific elements. Can't identify what exactly changed. |
| Blockchain | A chain of blocks, where each block contains a set of data and the hash of the previous block. | Data is immutable. Can use Merkle trees in blocks for better performance. Verifier doesn't need access to actual data, just hashes and structure. | Requires processing every block. Slow for large datasets. Requires more storage. |
| Merkle Tree | A tree structure in which every non-leaf node is the hash of its child nodes. Used for efficient verification of dataset contents. | Efficient verification of specific elements once the tree is built. Can prove inclusion or exclusion of data. Verifier doesn't need access to actual data, just hashes and structure. | Building the tree initially requires processing every element. Also needs more storage. |

| Method | Time to Construct | Time to Verify Element | Time to Verify Integrity | Storage Requirement |
|---|---|---|---|---|
| Full Comparison | $O(n)$ | $O(n)$ | $O(n)$ | $O(n)$ |
| Checksum | $O(n)$ | Not applicable | $O(1)$* | $O(1)$ |
| Blockchain | $O(n)$ | $O(n)$ or $O(\log m)$** | $O(n)$ | $O(n)$ |
| Merkle Tree | $O(n)$ | $O(\log n)$ | $O(\log n)$ | $O(n)$ |

*Assuming the checksum is already computed, the time to verify integrity is constant, i.e., $O(1)$.
**With a simple blockchain, verifying an element would be $O(n)$, but if each block contains a Merkle tree, it can be $O(\log m)$ where m is the number of transactions in the block.

being part of the dataset, if the data element does not match, the data element is not part of the dataset.

The use of Merkle trees to increase the transparency and trustworthiness of LLMs is a novel and valuable contribution to the field of machine learning, with potential applications across various industries and use cases. The drawbacks of the known solutions to this problem include a lack of transparency and accountability in the training and fine- Self-supervised—In a self-supervised training approach, the model generates its own labels using the data, rather than relying on pre-labeled data. In this case, the Merkle tree structure can still be used to organize the training data, but the data might not have pre-assigned labels. Instead, the model can use the training dataset to generate its own labels, which could then be organized into the Merkle tree structure.

The generated labels could also be verified using the Merkle tree structure to ensure their integrity and provenance.

The audit process for self-supervised training can be like the audit process for supervised training, in that an auditor can present the generated labels and the system can use the Merkle tree structure to verify the labels' integrity and provenance. The Merkle root of the tree, which represents the entire training dataset and label generation process, would also need to be stored in the metadata of the LLM.

Exemplary pseudocode in python to illustrate verification process by auditor:

```
import requests
import hashlib
# Define the Prover's API endpoints
PROVER_API = "https://prover-api.com"
MERKLE_ROOT_API = "/merkle-root"
MERKLE_PROOF_API = "/merkle-proof"
def get_hash_of_data(data):
    """
    Helper function to generate the SHA-256 hash of the data.
    """
    sha256_hash = hashlib.sha256( )
    sha256_hash.update(data.encode('utf-8'))
    return sha256_hash.hexdigest( )
def get_merkle_root( ):
    """
    API call to get the current Merkle root.
    """
    response = requests.get(PROVER_API + MERKLE_ROOT_API)
    if response.status_code == 200:
        return response.json( )['merkle_root']
    else:
        return None
def get_merkle_proof(data_hash):
    """
    API call to get the Merkle proof for a specific piece of data.
    """
    response = requests.post(PROVER_API + MERKLE_PROOF_API, json={'data_hash':
data_hash})
    if response.status_code == 200:
        return response.json( )['merkle_proof']
    else:
        return None
def verify_data(data):
    """
    Function to verify if a specific piece of data is in the dataset.
    """
    # Step 1: Get the hash of the data
    data_hash = get_hash_of_data(data)
    # Step 2: Get the Merkle root
    merkle_root = get_merkle_root( )
    # Step 3: Get the Merkle proof for the data
    merkle_proof = get_merkle_proof(data_hash)
    # Step 4: Verify the data using the Merkle proof and the Merkle root
    for sibling_hash in merkle_proof:
        data_hash = get_hash_of_data(data_hash + sibling_hash)
    # Check if the final hash matches the Merkle root
    return data_hash == merkle_root
```

For example, the auditor component 220 can provide a hash of the apple image to the data provider component 210 to initiate a data element inquiry regarding its inclusion in the image recognition foundation model dataset. Upon authorization, the data provider component 210 extracts the Merkle Root and corresponding Merkle Proof from the metadata of the image recognition foundation model and provides it to the auditor component 220. The auditor component 220 sequentially hashes the apple image hash with the hashes from the Merkle proof to determine if the result matches the Merkle root. The auditor component 220 confirms the inclusion of the apple image in the dataset because the final hash matches the Merkle root, the data element is thus verified as being part of the dataset.

FIG. 3 illustrates a flowchart of the method of verifying data using Merkle proof and root 300, in accordance with an exemplary embodiment of the present inventive concept.

The method of verifying data using Merkle proof and root 300 can include steps for:

organizing a dataset of data elements into a Merkle tree (step 302);

generating a Merkle root that represents the dataset organized into the Merkle tree (step 304);

providing a generated Merkle proof for a data element of the plurality of data elements (step 306); and determining whether the data element is included in the dataset using the Merkle root and the Merkle proof (step 308).

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

What is claimed is:

1. A computer-implemented method of verifying data using Merkle proof and root, the method comprising:

organizing a dataset into a Merkle tree, wherein the dataset includes a plurality of data elements;

training a large language model (LLM) using the dataset;

generating a result from a prompt used in the trained LLM;

generating a Merkle root that represents the dataset organized into the Merkle tree;

providing a generated Merkle proof for a specific data element of the plurality of data elements;

fine-tuning the trained LLM with an additional data element added to the dataset after training the LLM and generating the Merkle root;

identifying changes in the Merkle tree based on the additional data element;

storing the Merkle root in metadata of the LLM; and verifying that the result is informed by the specific data element and the additional data element by determining whether the specific data element and the additional data element are included in the dataset using the Merkle root and the Merkle proof.

2. The method of claim 1, wherein the dataset is included in a foundation model.

3. The method of claim 1, wherein the Merkle root and the generated Merkle proof are each a hash.

4. The method of claim 1, further comprising:

including the Merkle root in metadata of the dataset.

5. The method of claim 1, further comprising:

requesting a generated Merkle proof; and authorizing the request of the generated Merkle proof before the providing of the generated Merkle proof for the specific data element of the plurality of data elements.

6. The method of claim 1, further comprising:

sequentially hashing a data hash of the specific data element with hashes from the Merkle proof; and comparing the data hash of the specific data element and the Merkle root.

7. The method of claim 6, wherein responsive to the compared data hash of the specific data element matching the Merkle root, verifying the specific data element in the dataset.

8. A computer program product (CPP) for verifying data using Merkle proof and root, the CPP comprising:

one or more computer-readable storage media and program instructions stored on the one or more computer-readable storage media capable of performing a method, the method comprising:

organizing a dataset into a Merkle tree, wherein the dataset includes a plurality of data elements;

training a large language model (LLM) using the dataset;

generating a result from a prompt used in the trained LLM;

generating a Merkle root that represents the dataset organized into the Merkle tree;

providing a generated Merkle proof for a specific data element of the plurality of data elements;

fine-tuning the trained LLM with an additional data element added to the dataset after training the LLM and generating the Merkle root;

identifying changes in the Merkle tree based on the additional data element;

storing the Merkle root in metadata of the LLM; and verifying that the result is informed by the specific data element and the additional data element by determining whether the specific data element and the additional data element are included in the dataset using the Merkle root and the Merkle proof.

9. The CPP of claim 8, wherein the dataset is included in a foundation model.

10. The CPP of claim 8, wherein the Merkle root and the generated Merkle proof are each a hash.

11. The CPP of claim 8, further comprising:

including the Merkle root in metadata of the dataset.

12. The CPP of claim 8, further comprising:

requesting a generated Merkle proof; and authorizing the request of the generated Merkle proof before the providing of the generated Merkle proof for the specific data element of the plurality of data elements.

13. The CPP of claim 8, wherein the method further comprises:

sequentially hashing a data hash of the specific data element with hashes from the Merkle proof; and comparing the data hash of the specific data element and the Merkle root.

14. The CPP of claim 13, wherein responsive to the compared data hash of the specific data element matching the Merkle root, verifying the specific data element in the dataset.

15. A computer system (CS) for verifying data using Merkle proof and root, the CS comprising:

one or more computer processors, one or more computer-readable storage media, and program instructions stored on the one or more computer-readable storage media for execution by at least one of the one or more computer processors capable of performing a method, the method comprising:

organizing a dataset into a Merkle tree, wherein the dataset includes a plurality of data elements;

training a large language model (LLM) using the dataset;

generating a result from a prompt used in the trained LLM;

generating a Merkle root that represents the dataset organized into the Merkle tree;

providing a generated Merkle proof for a specific data element of the plurality of data elements;

fine-tuning the trained LLM with an additional data element added to the dataset after training the LLM and generating the Merkle root;

identifying changes in the Merkle tree based on the additional data element;

storing the Merkle root in metadata of the LLM; and verifying that the result is informed by the specific data element and the additional data element by determining whether the specific data element and the additional data element are included in the dataset using the Merkle root and the Merkle proof.

16. The CS of claim 15, wherein the dataset is included in a foundation model.

17. The CS of claim 15, wherein the Merkle root and the generated Merkle proof are each a hash.

18. The CS of claim 15, further comprising:

including the Merkle root in metadata of the dataset.

19. The CS of claim 15, further comprising:

requesting a generated Merkle proof; and authorizing the request of the generated Merkle proof before the providing of the generated Merkle proof for the specific data element of the plurality of data elements.

20. The CS of claim 15, wherein the method further comprises:

sequentially hashing a data hash of the specific data element with hashes from the Merkle proof; and comparing the data hash of the specific data element and the Merkle root.

* * * * *